United States Patent [19]
Greenley

[11] Patent Number: 5,761,469
[45] Date of Patent: Jun. 2, 1998

[54] METHOD AND APPARATUS FOR OPTIMIZING SIGNED AND UNSIGNED LOAD PROCESSING IN A PIPELINED PROCESSOR

[75] Inventor: Dale R. Greenley, Los Gatos, Calif.

[73] Assignee: Sun Microsystems, Inc., Mountain View, Calif.

[21] Appl. No.: 515,193

[22] Filed: Aug. 15, 1995

[51] Int. Cl.⁶ .......................... G06F 9/312; G06F 9/24
[52] U.S. Cl. .......................................................... 395/386
[58] Field of Search ............................................... 395/386

[56] References Cited

U.S. PATENT DOCUMENTS

| | | | |
|---|---|---|---|
| 5,051,885 | 9/1991 | Yate, Jr. et al. | 395/391 |
| 5,155,820 | 10/1992 | Gibson | 395/388 |
| 5,428,811 | 6/1995 | Hinton et al. | 395/800 |
| 5,430,851 | 7/1995 | Hirata et al. | 395/800 |
| 5,537,629 | 7/1996 | Brown et al. | 395/386 |
| 5,555,432 | 9/1996 | Hinton et al. | |
| 5,615,350 | 3/1997 | Hesson et al. | 395/394 |

Primary Examiner—Krisna Lim
Attorney, Agent, or Firm—Flehr Hohbach Test Albritton & Herbert LLP

[57] ABSTRACT

A method and apparatus for improving the performance of pipelined computer processors having fast clock speeds and processing cycles for performing signed and unsigned load operations to memory. A load instruction includes signed and unsigned variants. Signed load operations include accessing signed load data from memory, aligning and sign extending the value of the accessed data. The present invention provides two different schemes for scheduling the processor's pipelines to handle accessing signed and unsigned data from memory. The two schemes include a data dependent scheme that accesses data from memory where the sign of a load data is not known until the data has been accessed from memory, and an opcode dependent scheme when the sign value of data being accessed is known prior to accessing memory. In the data dependent scheme, the processor is scheduled to process a signed LOAD in two cycles if the load data is negative, and one cycle if the data is positive. In the opcode dependent scheme, signed load instructions are scheduled to execute in the processor's pipeline[s] in two cycles regardless of whether the data fetched from memory is negative or positive. The present invention further includes a delay return scheme in which the processor is able to process multiple consecutive load instructions by transitioning into a scheduling mode of handling all loads as signed.

22 Claims, 5 Drawing Sheets

| STAGES | G | E | C | N1 | N2 | N3 | W | |
|---|---|---|---|---|---|---|---|---|
| LDSB R0 | LD | Ex | Mem | SnEx | | | | — Case #5 |
| STAGES | | G | E | C | N1 | N2 | N3 | |
| ADD R1,R2,R3 | | LD | Ex | Mem | | | | — Case #6 |
| LDUB | | LD | Ex | Mem | | | | — Case #7 |
| STAGES | | | | G | E | E | C | |
| ADD R4,R5,R6 | | | | LD | Ex | Ex | Mem | — Case #8 |
| STAGES | G | E | C | N1 | N2 | N3 | W | — Case #9 |
| LDSB | LD | Ex | Mem | SnEx | | | Wr | |
| LDUB | | LD | Ex | Mem | SnEx | | | Wr |

*FIG. 4B*

METHOD AND APPARATUS FOR OPTIMIZING SIGNED AND UNSIGNED LOAD PROCESSING IN A PIPELINED PROCESSOR

BACKGROUND OF THE INVENTION

1. Field of the Invention

The present invention relates to pipelined computer processors, and, specifically to an apparatus and method to optimize the processing of LOAD instructions in microprocessors. The invention is useful for single pipeline architectures and also useful for superscalar pipelined architectures that have two or more pipelines for processing instructions.

2. Description of Related Art

Processors use LOAD instructions to fetch data from memory needed for computation in the processor. LOAD instructions typically access memory external to the processor and fetch data values contained therein. LOAD instructions specify a register or registers that are used to either identify or calculate the memory address where the needed data is located. For example, LOAD R1+R2→R3 specifies that the contents of register values R1 and R2 must be added together, and the address in memory corresponding to the sum is to be fetched from memory and stored in register R3. Many processor implementations also provide several types of LOAD instructions, including signed and unsigned LOADs.

Referring to FIG. 1, a superscalar processor and a memory hierarchy are shown. The superscalar processor 100 include several functional units that operate in parallel. A typical superscalar implementation may include an ICACHE 110, pre-fetch 120, decode/dispatch 130, and execution 140 units. The processor 100 may also be pipelined. Pipelining allows the processing of instructions to occur in stages. With each cycle, an instruction passes from one stage to the next. As the instruction progresses down the pipeline, the operation of each stage is performed on the instruction. Since pipelining permits multiple instructions to be executed simultaneously, processor throughput is increased. The memory hierarchy 190 shown in FIG. 1 includes register file 150, data cache 180 and main memory (not shown) which stores data needed by the processor 100. Located between the register file 150 and the data cache 180 are alignment unit 170 and sign extension unit 160.

ICACHE 110 stores recently used or soon to be used instructions of a program. The pre-fetch/buffer unit 120 is coupled to the ICACHE 110 and is responsible for pre-fetching instructions, and storing them in the buffer. The decode/dispatch unit 130 attempts to dispatch the maximum number of instructions (i) per cycle permitted in the processor. In a four issue processor, for example, the maximum number of instruction that can be issued per cycle is four (i=4). The decode/dispatch unit 130 contains grouping and dependency logic that attempts to group instructions for dispatch and insures that all dispatched instructions receive operands either from the register file 150 or through a bypassing operation (i.e., passing the result of instructions that have completed before updating the register file). If a pipeline or register values needed by one of the (i) instructions are not immediately available, the instruction may be stalled and dispatched in a later cycle.

During a resource dependency check the decode/dispatch unit 130 performs a partial decode on the next (i) instructions to determine the type or class of the instructions. If one or more of the instructions is a LOAD instruction, then the decode/dispatch unit 130: (1) performs a resource check to see of the if the LOAD pipeline[s] in the execution unit 140 is/are available and (2) checks to see if the register values defined by the LOAD instruction are available from either the register file or through a bypass operation. Only the LOAD instruction[s] among the (i) instructions where resource and data dependencies are resolved are dispatched by the decode/dispatch unit 130.

Signed and unsigned LOAD instructions can be generated in one of two ways. The instructions may be generated either by a programmer who specifically defines explicitly how the address of the LOAD instruction is calculated in memory, or generated by a compiler. Regardless of the type of LOAD, the needed data is fetched from the data cache 180 or a lower level of memory when the LOAD is executed.

Data accessed from data cache 180 is accessed as a function of the data size and the address offset in memory. Many memory subsystems provide access for bytes (8-bits), half-words (16-bits), words (32-bits), and double words (64-bits). Since needed data may not be physically stored consecutively in data cache 180, a LOAD access to data cache 180 must insure that the accessed data is aligned (i.e. both the upper and lower half of a word is fetched) into an appropriate format to write into a register in the register file 150. For example, when accessing a half-word from the data cache 180, the alignment unit 170 assures that the least significant bit of the half-word is in the least significant bit location in the register and the most significant bit of the half-word is in the bit position 15 in the register. After the word is aligned, it may be sign extended if the sign of the accessed word is ascertained during a signed load operation.

Referring to FIG. 2, a detailed block diagram of the alignment unit 170 and the sign extension unit 160 coupled between the data cache 180 and a target register in the register file 150 is shown. The purpose of the alignment unit 170 is to right justify the data fetched from the data cache 180. For example, when a byte is fetched from the data cache 180, regardless of its byte position (i.e., 0 through 7) in the cache, the byte is always right justified in the alignment unit. Similarly, a half word is also right justified in the alignment unit 170, regardless of what position the half word occupied in the cache 180, or even if the two bytes of the half word were present in two different cache lines in the data cache 180. Words, double words, and extended words are similarly aligned by the alignment unit 170. In an unsigned load operation, the rest of the register not loaded with actual data is zero filled.

The purpose of the sign extension unit 160 is to fill in the unoccupied bits of a register with sign information indicative of the sign of the data loaded from the data cache 180. The sign of the data is determined by its most significant bit ("MSB"). For example, if the MSB of the data is a "0", the data is considered positive. On the other hand, if the MSB is a "1", then the data is considered negative.

Referring to FIG. 3, several examples of a sign extension operation are shown. With a byte, the first seven bits (0–6) are used for storing data, the eighth bit (7) stores the sign of the data, and the remaining bits (8–63) are filled with either "0s" or "1s", depending on the sign of the eighth bit. Half-words, words, double-words are similarly sign extended, in the sign extension unit 160.

To illustrate an example of how sign extension is performed after data alignment, assume a load instruction to a memory location that fetches a byte of data with a value of decimal "+5", represented as binary number "00000101". After the data is aligned in the aligning unit 170 and arranged in the sign extension unit 160 as a binary "00000101", a sign extension operation is performed. To sign extend the byte, the most significant bit, i.e., "0", is copied to fill the unoccupied upper register positions 8 through 63 in the sign extension unit 160. After sign extending the load data accessed from the data cache 180, the data is written to a destination register in the register file 150.

Alternatively, if the value of the load data is determined to be of a negative value (e.g., −5), the binary representation of "00000101" using two's complement arithmetic is "11111011". The MSB of the load data will then be a binary value of "1". The MSB of binary value "1" from bit position 7 is then replicated by the sign extension logic through bit positions 8 through 63 in sign extension unit 160 and the result is stored in the destination register file 150. The sign extension unit 160 performs a similar operation on signed halfwords, words, and double words.

In older generation processors, data alignment and sign extension during a LOAD instruction is accomplished in one cycle. This is achieved because most older generation processors operate at relatively low clock speeds (i.e., 50–90 MHz) with slow cycle times (i.e., 20 nanoseconds or more). However, with many modern processors being designed to operate at much higher clock speeds (i.e., 167 MHz or more), and having larger register sizes (i.e., 64-bits or more), it is often difficult to perform both data alignment and sign extension of load data in one cycle (typically 6 nanosecond or less), especially when a cache access is performed before a load operation.

The limitations imposed on modern processors in performing data aligning and sign extension in the shorter cycle time become even more profound when a 64-bit processor has to perform load operations of program code from 32-bit machines in order to allow backwards compatibility between the new processor and existing instruction sets. In that case, not only is the aligning unit 170 required to align data sizes smaller than 64-bits, but the sign extension logic also has to perform sign extension on data of sizes smaller than the sign extension unit 160. Aligning and sign extending data sizes smaller than 64-bits may increase the cycle time required to execute such instructions.

The inability to perform data alignment and sign extension in one cycle means that 64-bit processors supporting load alignments and sign extensions may have to take additional cycle time to perform a LOAD from memory. These extra clock cycles may in turn tend to impede the performance of the processor. Furthermore, in some instances the processor may not be aware of whether the data is positive or negative until after the data has been fetched from memory. Such instances may require pushing the alignment and sign extension logic into the next cycle thereby causing extra cycles in the pipeline. The need for extra clock cycles is even more prevalent when a LOAD instruction is followed immediately by a data dependent instruction relying on the value of the load data to execute.

To avoid the problem of adding unnecessary cycles to the pipeline, some modern processors such as the DEC Alpha™ architecture processors do not support sign extension. However, these processors still do have the problem of having to compile 32-bit code programs written for 32-bit processors on the newer 64-bit processors. Therefore, another approach is necessary to optimize scheduling a processor's pipeline to accommodate signed LOADs without incurring excessive processor cycle time.

SUMMARY OF THE INVENTION

The present invention provides processor pipeline scheduling logic to schedule the execution of signed and unsigned LOAD instructions at a variable number of cycles depending on the type of LOAD instruction. The present invention also provides a sign ascertaining scheme to determine the sign value of data accessed from memory. The present invention also includes a data dependent load scheme and an opcode load scheme which are utilized to schedule the execution of signed and unsigned LOADs.

In the opcode load implementation, a compiler or programmer explicitly specifically defines explicitly how the address of signed data being accessed in memory is calculated. The opcode implementation assumes that all signed LOADs require sign extension when LOADs are scheduled. An unsigned opcode LOAD instruction is therefore scheduled in the processor's pipelines to execute in one cycle. Unsigned opcode LOADs take one cycle to execute because the value of the data is known to be positive, thereby obviating the need to perform data sign extension. For signed opcode LOAD instructions, the processor's pipelines are scheduled to execute opcode signed LOAD instructions in two clock cycle regardless of whether the data accessed is positive or negative.

With the data dependent load implementation, on the other hand, the processor has no prior knowledge of the sign value of the data been accessed in memory. The sign of the data is known only after the data has been completely accessed from memory. The data dependent scheme assumes all LOADs (both signed and unsigned) not to require sign extension thereby allowing the processor to dynamically schedule the pipelines depending on the sign of a load. For instance, signed LOAD instructions may be scheduled to execute at a variable number of cycles depending on whether the sign value of the data is positive or negative. Signed LOAD instructions which access positive data are scheduled to execute in one cycle; those which access negative data are scheduled to execute in two cycles. In order to execute positive data dependent load instructions in one cycle, it is necessary to skip the sign extension step.

The present invention further includes a delayed return scheduling mechanism for handling multiple consecutive LOAD instructions in either the data dependent or opcode dependent scheme whereby the processor is scheduled to handle all loads as signed. The processor continues in such delayed return mode until such time that the dispatch unit dispatches non-LOAD instruction to the processor's pipeline[s].

The described embodiment also includes a selection mechanism for arranging the low order bits representing the value of data fetched in memory to fill the lower order bit positions in an aligning unit during the formatting of data accessed from memory as part of the sign ascertaining function of the present invention. The selection mechanism allows the aligning unit to align data to be accessed on byte boundaries in order to maintain any alignment restrictions that the processor may impose during a word accessed from memory.

BRIEF DESCRIPTION OF THE DRAWINGS

FIGS. 4A and 4B are diagrammatic illustrations of instruction pipelining under different conditions that may result according to the operation of the present invention.

DETAILED DESCRIPTION OF THE PREFERRED EMBODIMENT

FIGS. 1 through 4B of the drawings disclose various embodiments of the present invention for purposes of illustration only. One skilled in the art will readily recognize from the following discussion that alternative embodiments of the structures and methods illustrated herein may be employed without departing from the principles of the invention.

Referring again to FIG. 1, the processor 100 of one embodiment of the present invention may issue LOAD instructions using the opcode load scheme or the data dependent load scheme. The LOAD instructions are typically compiler or programmer defined and may include signed and unsigned LOAD instructions. In the SPARC-V9 instruction set, for example, signed load instructions include: LDSB which loads a signed byte; LDSW which loads a signed word; LDSH which loads a signed half-word; and LDX which loads a signed double word. To load unsigned data, the SPARC-V9 instruction set includes the following load instructions: LDUB to load an unsigned byte; LDUH to load an unsigned half word; and LDUW to load an unsigned word.

In order to handle the scheduling of the processor 100 pipelines to execute signed and unsigned LOAD instruction in a variable number of cycles, the following rules are implemented by one embodiment of the present invention: in the opcode implementation, signed LOAD instructions are scheduled to execute in two cycles; unsigned LOAD instructions are scheduled to execute in one cycle; signed LOADs in the data dependent scheme, on the other hand, are scheduled to execute in one or two cycles depending on whether the load data is positive or negative. If the signed load data is positive, the processor's pipelines are scheduled to execute the positive signed LOAD instruction in one cycle. Negative signed LOAD instructions are executed in two cycles. In order to execute positive signed LOAD instructions in one cycle, the value of the load data is assumed to be positive and is sign extended by zero-filling the register in much the same manner as unsigned loads are handled by the sign extension unit.

Figure 1:
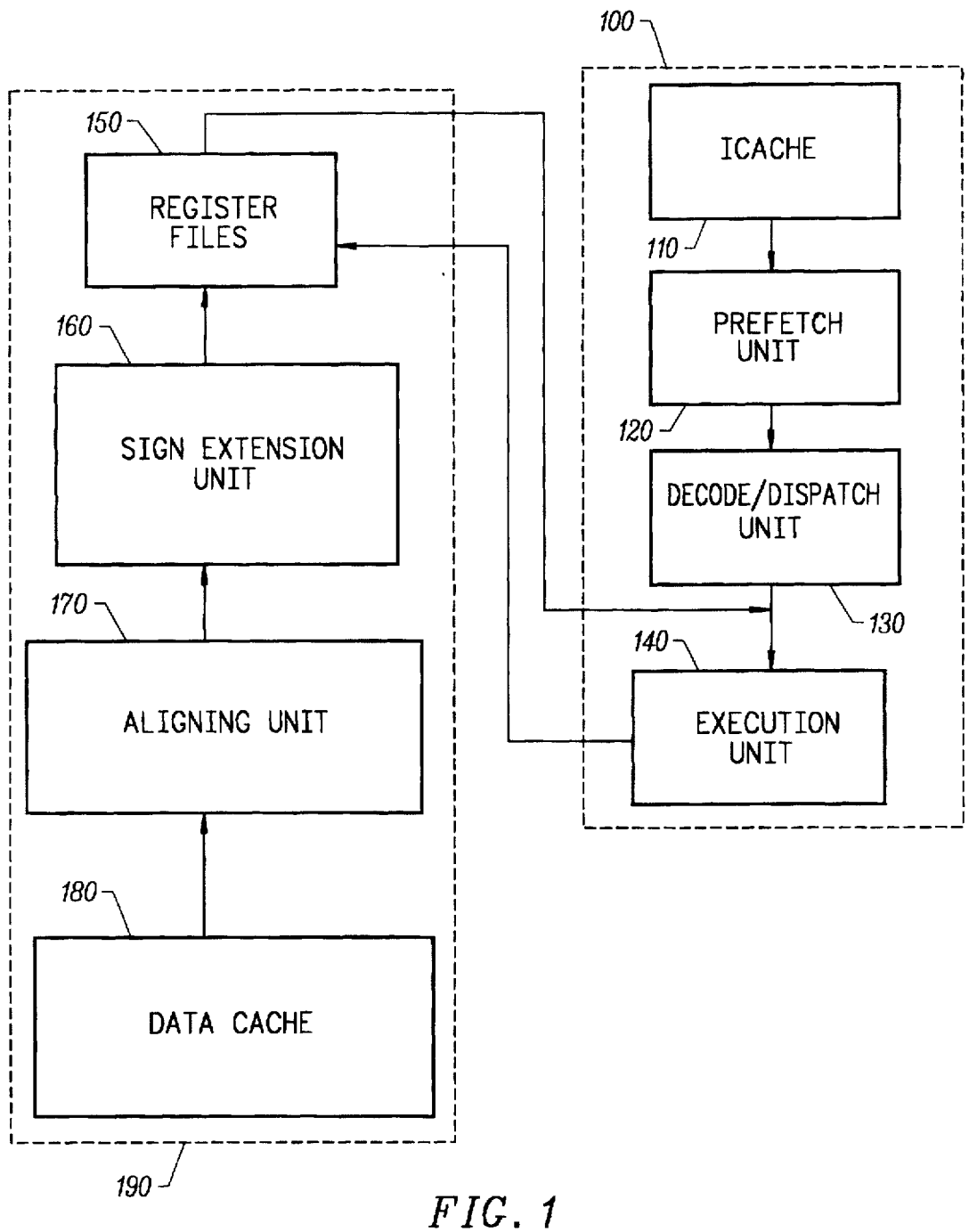
FIG. 1 is a simplified block diagram of a superscalar processor and a memory hierarchy including a data cache and a data aligning and sign extension unit.
Figure 2:
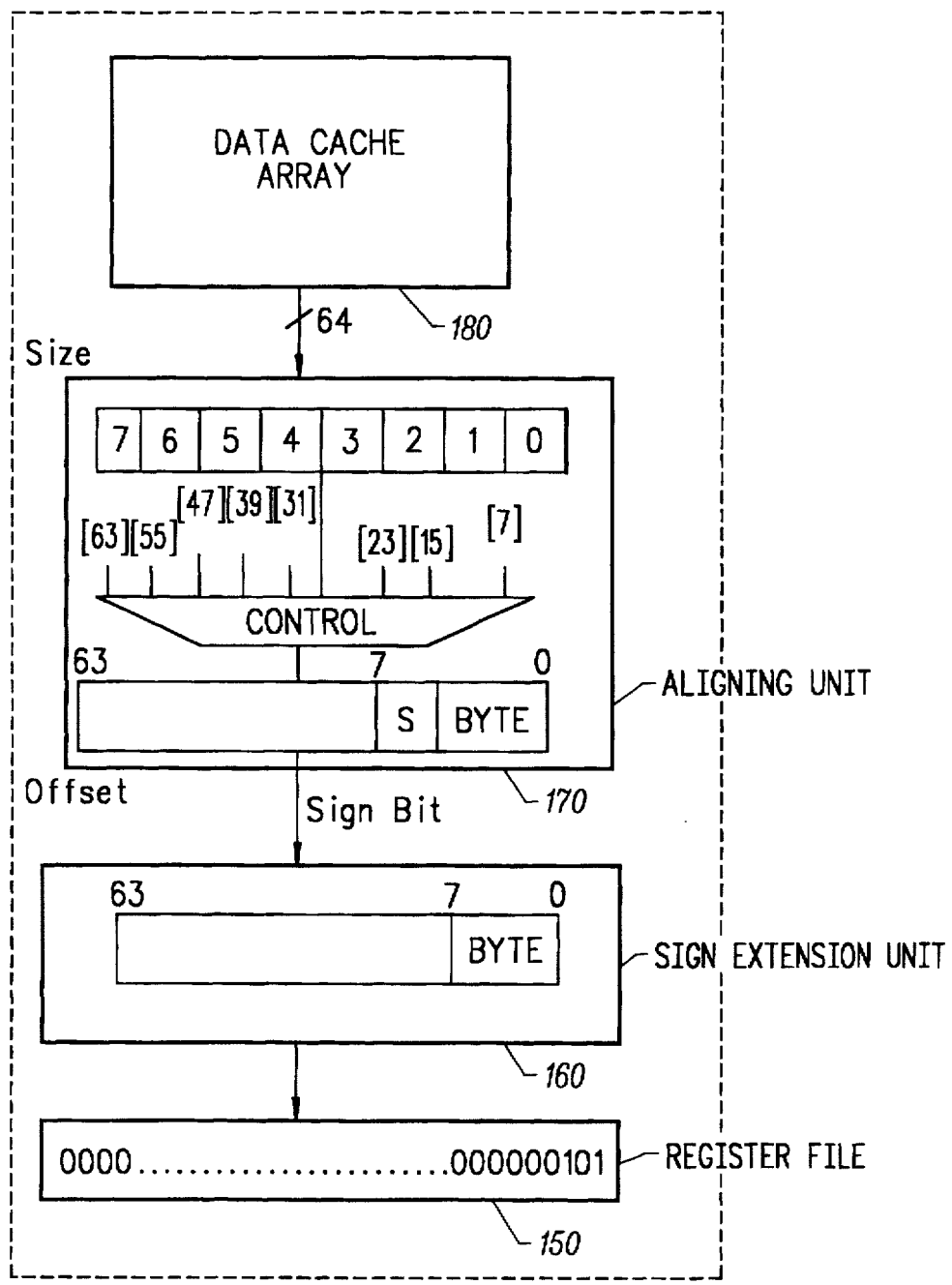
FIG. 2 is a simplified block diagram of a data cache unit, a load alignment and sign extension unit.
Figure 3:
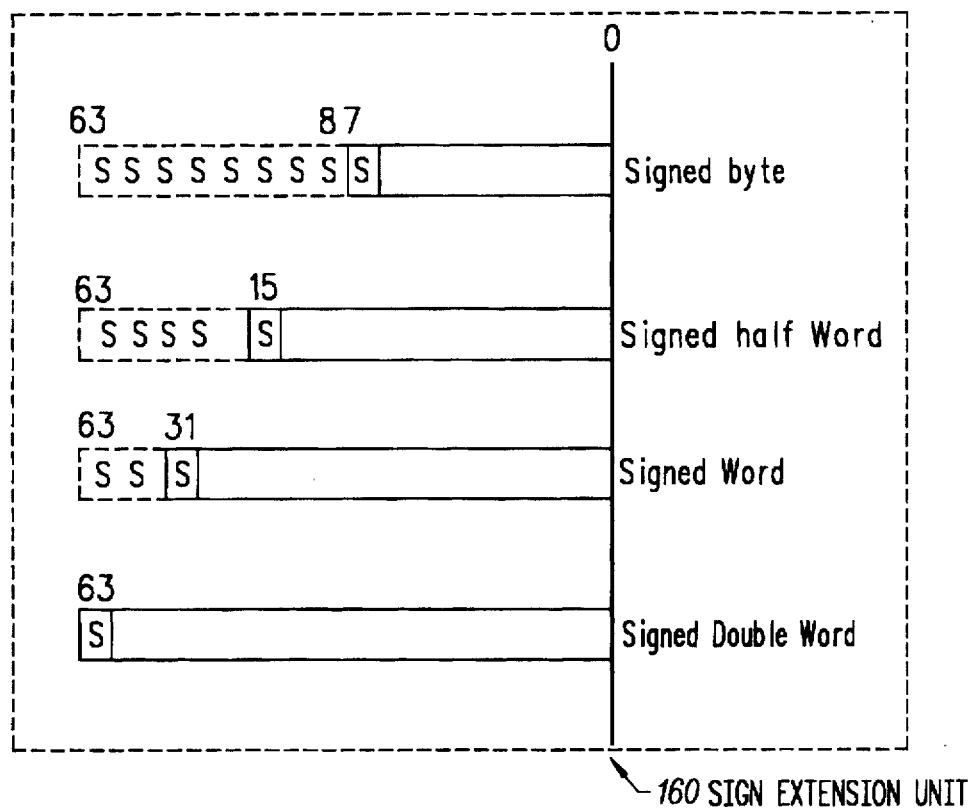
FIG. 3 is a simplified block diagram illustrating several examples of load data sign extension in a sign extension unit.
Figure 4A:
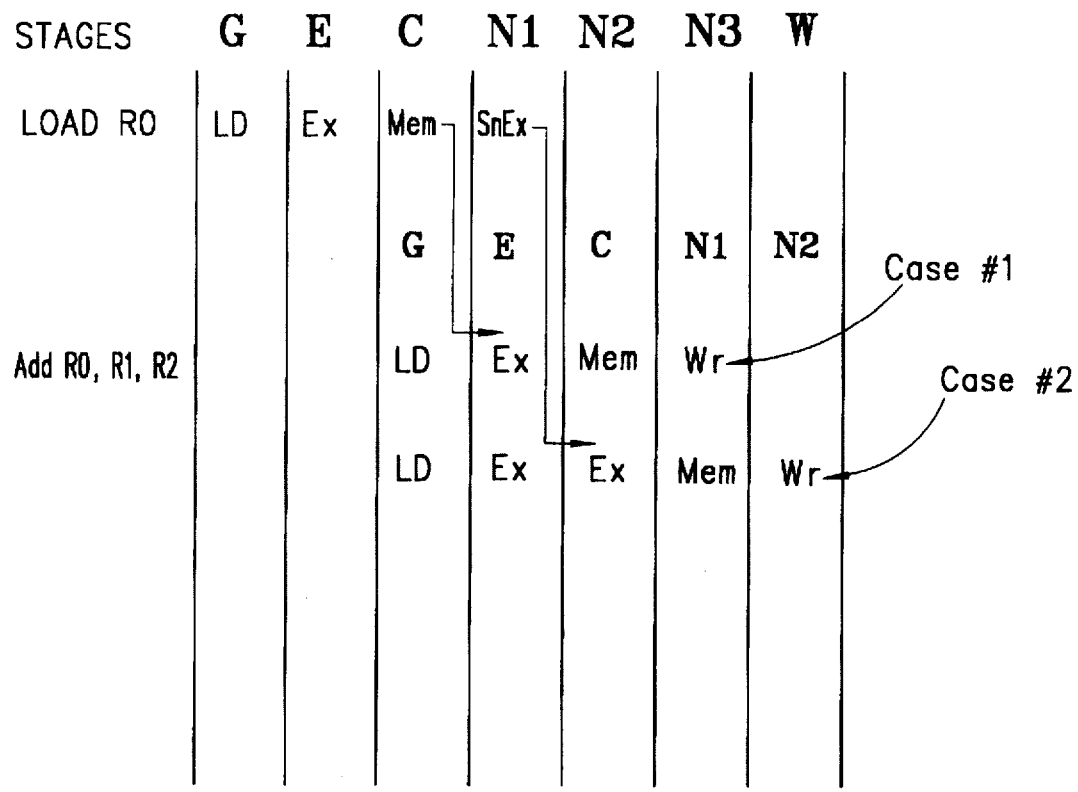

FIG. 4A and 4B are exemplary illustrations of one embodiment of the present invention. FIG. 4A illustrates a data dependent load implementation of the present invention and FIG. 4B illustrates an opcode load implementation of the present invention. The examples have been selected to highlight features and advantages of the present invention.

Referring now to FIG. 4A, a pipeline is shown to include an instruction dispatch stage (G) for dispatching instructions, an instruction executing stage (E), a data access stage (C) when data is accessed from cache 180 and aligned in alignment unit 170, and a sign extension stage (N1) when a sign extension operation is performed on the data accessed at stage C. The pipeline also includes additional stages N2 and N3 to allow the scheduling logic of the present invention to dynamically adjust the pipeline as may be required by a particular load instruction. In one embodiment of the present invention, the pipeline shown in FIG. 4A executes positive signed LOAD instructions in one cycle and negative signed LOAD instructions in two cycles.

As illustrated in FIG. 4A, the pipeline is scheduled to process a load instruction to register zero (R0) in the processor. The LOAD instruction begins with the dispatching of the LOAD instructions (LD) at stage G, executes (Ex) the address of the data for the LOAD instruction R0 at stage E, and fetches the load data (Mem) at stage C. Since the sign of the load data is unknown to the dispatch unit until the data has been accessed at stage C, the sign of the value of the load data will not be known until the end of stage C. Consequently, if the value of the load data is determined to be signed, the load instruction proceeds to stage N1 to be sign extended. Furthermore, the ADD instruction must be dynamically stalled in stage E one additional cycle to wait for the sign extended data. On the other hand, if the fetched data proves to be unsigned then data is made available to the Add instruction at the end of stage C.

In case #1, the LOAD instruction is found to be unsigned. The Add instruction (Add R0, R1, R2) immediately following the LOAD instruction depends on the results of the load data in register R0. Since the Add instruction in case #1 relies on the results in register (R0), the Add instruction will begin executing as soon as the register value R0 becomes available in stage C. The Add instruction cannot start at the same cycle (especially for superscalar machines) or the next cycle because the data from the load operation is not available until the end of stage C requiring the loads at stage N1 and the Add instruction at stage E to line up.

In case #2, the load instruction is found to require sign extension at stage N1. Consequently, the load data will not be available until the end of stage N1. Accordingly, the execution of the Add instruction is delayed until the end of stage N1. Therefore, the pipeline scheduling logic of the present invention dynamically slides the execution of the Add instructions (Ex) in the pipeline one extra cycle to ensure that the value of the load data is obtained from the LOAD instruction.

FIG. 4B illustrates an example of two opcode load instructions each followed immediately by an Add instruction. In case #5, the LOAD instruction is an opcode instruction to load a signed byte word. In one embodiment of the present invention, the pipeline is scheduled to take two cycles for an opcode LOAD instruction of signed data regardless of whether the value of the data is positive or negative, and one cycle for unsigned data.

As illustrated in FIG. 4B, the LOAD instruction begins with the dispatching of the LOAD instruction (LD) at stage G, executes the address of the data for the LOAD instruction R0 (Ex) at stage E, and fetches and aligns the load data (Mem) at stage C. Because the LOAD instruction R0 is to a signed data, the LOAD instruction takes an additional cycle (i.e., stage N1) when sign extension is performed on the fetched load data (SnEx). In case #6, the Add instruction immediately following the LOAD instruction does not depend on the value of the load data in register R0. Therefore, the Add instruction will start processing at stage E one clock period after the LOAD instruction begins and execute without requiring any additional clock cycles (i.e., starts processing at stage G and completes processing at stage C).

In case #7, the dispatch unit dispatches a second LOAD instruction in the pipeline to register (R4) which is a LOAD of an unsigned byte word. The second LOAD instruction is immediately followed by an Add instruction to register R6 which depends on the results of the LOAD instruction to register R4. Because many scalar and superscalar processors allow only one LOAD instruction to return data to the register file one at a time, the LOAD instruction in case #5 impacts the LOAD instruction in case #7.

Since the LOAD instruction in case #5 is not completed until stage N1, the LOAD instruction in case #7 will not be able to fetch data from memory (Mem) until stage N1 when the first LOAD instruction is completed. Consequently, the Add instruction in case #8 which depends on the LOAD instruction in case #7 will start execution at stage N1.

In the present invention when the Add instruction in case #8 is executed, the pipeline is automatically sled one cycle to accommodate the completion of the first LOAD instruction in case #5. In the prior art, performing two LOAD instructions and two Add instructions as illustrated in FIG. 4B will have stalled the pipeline. However, the scheduling logic of the present invention is able to dynamically adjust the pipeline when the dispatch unit detects two consecutive LOAD instructions to be executed in the pipeline, thereby preventing the pipeline from stalling. Adjusting the pipeline prevents the second Add instruction (i.e., case #8) which relies on the second LOAD instruction from stalling, even though the second LOAD instruction is to an unsigned data which did not require an additional cycle to execute.

Case #9 illustrates an instance where two consecutive load instructions are executed in the pipeline. As show in case #9, if unsigned data returns in stage C and signed data returns in stage N1, there is an issue as to how to handle a second iteration of such instructions. The present invention handles such multiple consecutive loads by using a delayed return mode in which the processor transitions into a scheduling mode of handling all loads as signed. The processor continues in the delayed return mode until the next cycle when a LOAD instruction is not dispatched from the dispatch unit. This approach of handling consecutive load applies for both the data dependent and opcode load schemes of the present invention.

Thus, a method and apparatus for scheduling a processor's pipeline to reduce processor cycle time during signed load operations from memory is described. From the above description, it will be apparent that the invention disclosed herein provides a novel and advantageous method and apparatus for scheduling a processor's pipeline to handle both signed and unsigned loads from memory in a computer system based on either an opcode or data dependent scheme. The foregoing discussion discloses and describes exemplary methods and embodiments of the present invention. As will be understood by those familiar with the art, the invention may be embodied in other specific forms without departing from its spirit or essential characteristics, and thus, the described embodiment is not restrictive of the scope of the invention. For example, the invention could be used with any microprocessor platform, including Intel's X86, the Power PCTM, DEC Alpha™, etc., and could be used with any instruction set. The following claims are indicative of the scope of the invention. All variations which come within the meaning and range of equivalency of the claims are to be embraced within their scope.

What is claimed is:

1. A method for scheduling a processor's pipeline to optimize load instructions processing in a variable number of cycles, said method comprising the steps of:
   (a) dispatching a load instruction defining a memory location;
   (b) ascertaining if the dispatched load instruction is signed or unsigned; and
   (c) scheduling the execution of the load instruction in a variable number of cycles depending on whether the load instruction is signed or unsigned.

2. The method of claim 1 further comprising the step of executing the load instruction and aligning data fetched from said memory location such that said data is justified when written to a destination register regardless of how said data is stored in said memory location.

3. The method of claim 2 wherein during said aligning step the value of said data fetched from said memory location is determined to be signed or unsigned.

4. The method of claim 1 further comprising the step of sign extending the value of data fetched from said memory location if said data is determined to be signed.

5. The method of claim 4 wherein said sign extending step includes the step of filling in the unoccupied bits of a destination register with sign information representative of the sign of said data fetched from said memory location.

6. The method of claim 1 further comprising the step of scheduling said load instruction ascertained to be unsigned to execute in said pipeline in one cycle.

7. The method of claim 1 further comprising the step of scheduling said load instruction ascertained as signed and positive to execute in said pipeline in one cycle.

8. The method of claim 1 further comprising the step of scheduling said load instruction ascertained as signed and negative to execute in said pipeline in two cycles.

9. The method of claim 1 wherein the sign of said load instructions is predetermined prior to accessing data corresponding to said load instruction from said memory location.

10. The method of claim 1 wherein said scheduling step schedules said load instruction to be executed in two cycles if said load instruction is ascertained to be signed and negative.

11. The method of claim 1 wherein said scheduling step schedules said load instruction to be executed in one cycle if said load instruction is ascertained to be signed and positive.

12. The method of claim 1 wherein said scheduling step further includes a delayed return mode step wherein said processor's pipeline is scheduled to handle multiple consecutive LOAD instructions as signed loads.

13. In a computer system having a pipelined processor for processing a stream of instructions including load instructions defining a memory location, said load instructions being executed at a variable number of cycles depending on the type of said load instruction, said computer system comprising:
   (a) a sign ascertaining unit coupled to a memory subsystem in said computer system to ascertain if said load instruction is signed or unsigned; and
   (b) a pipeline scheduling logic coupled to said processor configured to schedule the execution of said load instruction at a variable number of cycles depending on the type of said load instruction.

14. The computer system of claim 13 further comprising an alignment unit configured to receive and format data fetched from said memory subsystem corresponding to said load instructions into an appropriate format for writing a destination register.

15. The computer system of claim 13 further comprising a sign extension unit coupled to said alignment unit configured to receive and sign extend the sign value of the data fetched from said memory corresponding to said load instructions.

16. The computer system of claim 13 wherein said aligning unit is at least 64-bits wide.

17. The computer system of claim 13 wherein the size of said aligning unit is the same as the size of said destination register.

18. The computer system of claim 13 wherein said aligning unit includes a selection circuit for selecting the data fetched from said memory corresponding to said load instructions to right justify the data fetched from said memory subsystem when storing the data in a destination register.

19. The computer system of claim 13 wherein said sign extension unit is of the same size as said aligning unit such that the binary value of the data from said aligning unit is right justified in said sign extension unit.

20. The computer system of claim 13 wherein said scheduling logic schedules said pipeline to execute said load instruction in one cycle if said load instruction is ascertained to be unsigned and when said load instruction is found to be of a positive signed value.

21. The computer system of claim 13 wherein said scheduling logic further schedules said pipeline to execute said load instruction in two cycles if said load instruction is determined to be of a negative signed value.

22. The computer system of claim 13 wherein said scheduling logic further schedules said pipeline to execute multiple consecutive signed or unsigned load instructions as signed loads.

* * * * *